United States Patent
Arnold et al.

(10) Patent No.: US 7,814,755 B2
(45) Date of Patent: Oct. 19, 2010

(54) METHOD AND DEVICE FOR MONITORING THE TEMPERATURE IN A REFRIGERATOR

(75) Inventors: Friedrich Arnold, Aalen (DE);
Wolfgang Becker, Blaustein (DE);
Michael Neumann, München (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 560 days.

(21) Appl. No.: 10/532,255

(22) PCT Filed: Oct. 31, 2003

(86) PCT No.: PCT/EP03/12153
§ 371 (c)(1),
(2), (4) Date: Apr. 21, 2005

(87) PCT Pub. No.: WO2004/042299
PCT Pub. Date: May 21, 2004

(65) Prior Publication Data
US 2006/0021357 A1 Feb. 2, 2006

(30) Foreign Application Priority Data
Nov. 5, 2002 (DE) ................. 102 51 537

(51) Int. Cl.
*G01K 13/00* (2006.01)
*F25B 49/00* (2006.01)
*G01K 11/00* (2006.01)
(52) U.S. Cl. ............................ 62/129; 62/125; 374/162
(58) Field of Classification Search ................. 374/161, 374/162, 159; 62/125, 127, 129
See application file for complete search history.

(56) References Cited

U.S. PATENT DOCUMENTS

| | | | |
|---|---|---|---|
| 2,923,786 A * | 2/1960 | Jones | 200/56 R |
| 4,844,622 A | 7/1989 | Weiss | |
| 5,004,355 A * | 4/1991 | Ryan | 374/194 |
| 5,326,174 A | 7/1994 | Parker | |
| 6,176,197 B1 * | 1/2001 | Thompson | 116/217 |
| 6,673,271 B2 * | 1/2004 | Hodgkinson et al. | 252/408.1 |
| 6,712,996 B2 * | 3/2004 | Wu et al. | 252/408.1 |
| 2002/0055578 A1 * | 5/2002 | Wu et al. | 524/445 |
| 2003/0147450 A1 * | 8/2003 | Witonsky et al. | 374/141 |

FOREIGN PATENT DOCUMENTS

| | | |
|---|---|---|
| DE | 87 17 267 U1 | 10/1988 |
| EP | 1 291 630 A1 | 3/2003 |

(Continued)

OTHER PUBLICATIONS

International Search Report for PCT/EP2003/012153.

*Primary Examiner*—Chen-Wen Jiang
(74) *Attorney, Agent, or Firm*—James E. Howard; Andre Pallapies

(57) ABSTRACT

A temperature monitoring process for a refrigerator interior and a device for such monitoring. A monitoring unit is formed by a temperature sensitive element and a thermal buffer liquid in a transparent container. The monitoring unit container is placed in the refrigerator in any location to be monitored. The temperature is visually detected by observing a temperature related variable characteristic of the temperature sensitive element, such as the color of one or more areas of the temperature sensitive element.

22 Claims, 2 Drawing Sheets

FOREIGN PATENT DOCUMENTS

| | | |
|---|---|---|
| FR | 2 494 845 A1 | 5/1982 |
| FR | 2 613 069 A1 | 9/1988 |
| GB | 1 515 231 A | 6/1978 |
| JP | 59 230128 A | 12/1984 |
| JP | 1 113627 A | 5/1989 |
| JP | 2 038828 A | 2/1990 |
| JP | 2002129153 A1 | 5/2002 |
| WO | WO 94/10546 A1 | 5/1994 |

* cited by examiner

METHOD AND DEVICE FOR MONITORING THE TEMPERATURE IN A REFRIGERATOR

The present invention relates to a process and a unit for temperature monitoring in a refrigerator.

Refrigerators are usually equipped with temperature sensors, which emit an electric temperature measuring signal, used by an electronic control of the devices to regulate the operation of a compressor such that the temperature detected by the sensor remains in a preset nominal range. Such sensors are usually attached to a wall of the storage space of a refrigerator and essentially detect the prevalent ambient temperature in the storage space. This ambient temperature can be subject to strong short-term fluctuations, such as when a door of the refrigerator is opened. A fast reaction capability of the temperature sensors is wanted to quickly determine any warming in the storage space of the refrigerator and to be able to react to this by starting up the compressor.

The temperature detected by such a sensor does not necessarily agree with the prevailing temperature inside pieces of solid cool goods or inside cool goods containers located in the storage space. Their temperature barely reacts to brief influx of warm air into the refrigerator. A major influence on this temperature is made in particular by the site inside the storage space, at which such an item of cool goods is located, as the distribution of temperature in the interior of a refrigerator, in particular a refrigerator, is generally not uniform. Such non-homogenous temperature distribution inside a refrigerator is thoroughly desired per se for cool goods with different requirements to be stored at the storage temperature under optimal conditions in each case. Yet the result can be that cool goods perish unwantedly early or undergo a loss in quality, when they are deposited in a place which is unsuitable, too warm or too cold for them.

The aim would therefore be to have processes and units available which inside a refrigerator allow local assessment of temperatures which are adjusted long-term inside cool goods.

DE-U 87 17 267 discloses an indicator for temperature monitoring of cooling and deep-freeze appliances, which can be placed at various places inside a refrigerator to ascertain whether the ambient temperature has at least temporarily exceeded a critical limit value. For this purpose the known indicator has a transparent cavity, filled with an indicator liquid, which freezes at the critical temperature, which in turn needs to be adhered to and monitored. After the liquid has frozen the indicator is set such that the frozen liquid is now in an upper area of the cavity. If during running of the refrigerator the critical temperature is exceeded, such that the indicator liquid thaws, it is collected in a lower part of the cavity. A user can spot that the critical temperature has been temporarily exceeded at this relocation, even if the refrigerator has meantime automatically resumed its normal operating and the indicator liquid in the cavity is again frozen. This unit is suited to prove a temporary drop in cooling. On superficial observation it could also be assumed that this unit is suitable for monitoring adhering to a minimum temperature preferred for specific cool goods, in that a liquid with a corresponding freezing point is selected as indicator liquid, the unit is placed at a site in the storage space of the refrigerator to be checked and after a certain time a check is made as to whether the liquid is frozen or not. At the same time however there is the problem that the timeframe required for the liquid to fully freeze is the longer the less the difference between the temperature at the site of the unit and the freezing temperature of the liquid, so that the process of freezing can require a long time, during which a reliable reading from the unit is not possible. Also, this known unit must be held by hand to determine whether the liquid is frozen or not, so that, when monitoring is continued, it is not ensured that measuring is continued at the same place and under the same conditions.

The object of the present invention is to provide a process and a unit for temperature monitoring in a refrigerator, enabling on the one hand a temperature to be detected over long timeframes (in the order of one hour or more), and on the other hand long-held transition states to be avoided, in which a secure reading is not possible.

This task is solved by a process for temperature monitoring in a refrigerator having the features of Claim 1 or respectively a unit having the features of Claim 5.

Using the thermal buffer mass on the one hand ensures that the temperature equalisation between the temperature-sensitive element and its environment is delayed similarly, how if this element were surrounded by a thermal insulation layer, and on the other hand at minimal temperature differences between it and the temperature-sensitive element the buffer mass allows the exchange of a comparatively large quantity of energy, required for a phase transition or another change of a temperature-dependent property of the temperature-sensitive element. That is, if the property of the temperature-sensitive element to be observed for temperature monitoring is its state of aggregation, so can, when the buffer mass reaches or respectively drops below the freezing point of the temperature-sensitive element, between the buffer mass and the temperature-sensitive element a large quantity of energy is transferred and the phase transition can run considerably faster than is possible with the known unit, wherein thermal insulation hinders heat exchange between the indicator liquid and the environment.

With the present invention the temperature-sensitive element can be any type whatsoever; this could be a thermoelectric element, a conventional thermometer utilising the heat expansion of a liquid, or the like. Since the object with using the invention is essentially to prove that a certain desired cooling temperature for cool goods is not exceeded, an element with a property, those in each case in a temperature range below or respectively a temperature range above the limit temperature to be monitored has two different values and transfers to the region of the limit temperature between these two values, can preferably be used as a temperature-sensitive element. As already mentioned and disclosed in DE-U 87 17 267, this property can be the state of aggregation of an indicator liquid, and the property is preferably the temperature-dependent variable colour of a surface of the temperature-sensitive element.

In the entire application temperature range of the inventive process or respectively the inventive unit the buffer mass is preferably a liquid, preferably water, and is contained within a container in the inventive unit. The container preferably has a capacity for the buffer liquid in the range of 50 to 250 cm$^3$.

The temperature-sensitive element can preferably swim in the buffer liquid, so that it is surrounded on all sides by the buffer liquid and shielded by it from rapid fluctuations in temperature in the environment.

The limit temperature, by which the property of the temperature-sensitive element changes its value, is preferably between +7 and +10° C.

The invention is also realised in a temperature-sensitive element for use in a unit as defined hereinabove, which can swim in water and has a property which takes on various discrete values above or respectively below a limit temperature to be monitored.

Further features and advantages of the invention will emerge from the following description of embodiments with respect to the attached figures, in which.

Figure 1:
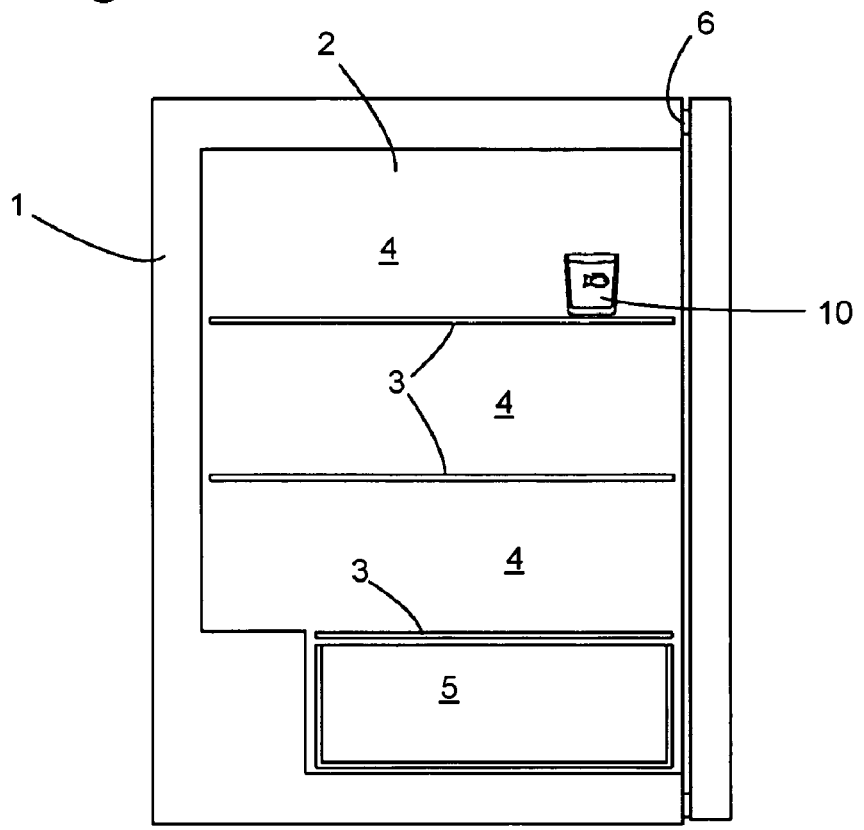
FIG. 1 is a schematic sectional illustration of a refrigeration appliance, in which a unit for temperature monitoring according to the present invention is placed.

In a schematic section FIG. 1 shows a domestic refrigerator 1 as an example of a refrigerator, in which the present invention can be used. The inner space 2 of the refrigerator 1 is subdivided by compartment floors 3 into a plurality of compartments 4, 5. The upper three compartments 4 are cooled by a (not illustrated) evaporator, attached to a rear wall of the interior 2. The lowest compartment 5 is not in direct contact with the evaporator and is cooled only by heat and/or air exchange with the superjacent compartment 4. It is thus generally warmer than the compartments 4. The compartments 4 can however also exhibit varying temperatures, since the heat influx from outside into the compartments 4 is variable depending on its proportion on the wall surface of the interior 2 or respectively on a magnetic seal 6, running between housing and door of the refrigerator 1. Also in the direction of depth of a compartment 4 a temperature gradient can be set between the evaporator on the rear wall and the door, resulting in the rearwards area of a compartment 4 for storing a certain foodstuff still being suitable, whereas in a front region the temperatures are too high.

Figure 2:
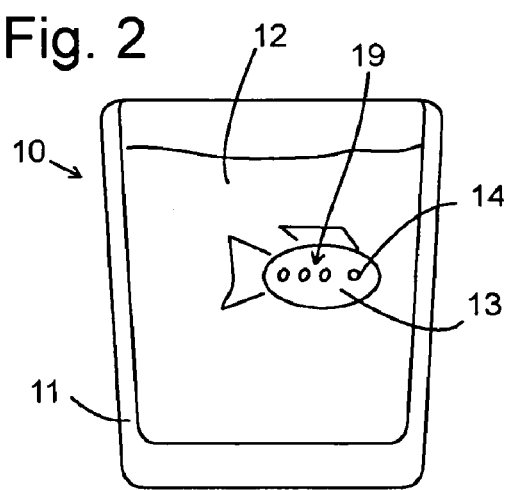
FIG. 2 shows the unit for temperature monitoring of FIG. 1 on an enlarged scale.

An inventive unit for temperature monitoring is designated in FIG. 1 by reference numeral 10 and illustrated on an enlarged scale in FIG. 2. The unit comprises a see-through container 11, e.g. made of glass or transparent plastic, filled with water 12, in which a swim element 13 swims. In a manner described later in even greater detail the swim element 13 acts as a temperature-sensitive element, i.e. an element with a property variable depending on the temperature. The density of the swim element 13 is matched exactly to that of the water 12, so that the swim element 13 bobs freely in the water 12 and can follow convection currents unhindered forming in the water 12 during the course of temperature equalisation between the water 12 and the environment of the unit. The form of the swim element 13 can be any at all, and here takes the form of a fish, to help a user recall the inventive type of use of the swim element 13, swimming in water if the swim element 13 is kept outside the refrigerator 1, possibly separated from the container 11.

The swim element 13 can be formed e.g. as a hollow body from plastic, whereof the inner cavity contains the quantity of a ballast material such as sand required for floating the swim element 13 in the water. The outside of the swim element 13 is coloured at least locally, here in the vicinity of the eyes 14 of the fish, with a dye which clearly and visibly changes its colour in a narrow temperature interval of a few degrees. Such dyes, which e.g. turn from black to green when a limit temperature is exceeded, are known for a large number of limit temperatures and are used conventionally for building optical temperature display elements. The change temperature of the dyes used for eyes 14 is effectively in a range from +7 to +10° C.

If the unit 10 with a quantity of e.g. ca. 125 cm$^3$ water is placed in the container 11 in the refrigerator 1, it lasts at least one hour until the temperature of the water 12 has matched that of the interior 2 within the scope of the display precision of the dye. When the eyes of the fish are black following this time period this means that the temperature in the unit for storing the most perishable foodstuffs is sufficiently low. If the eyes of the fish are green however, the thermostat of the refrigerator 1 must be adjusted to a lower temperature so that easily perishable foodstuffs can be stored in the unit 10 for a longer time.

Figure 3:
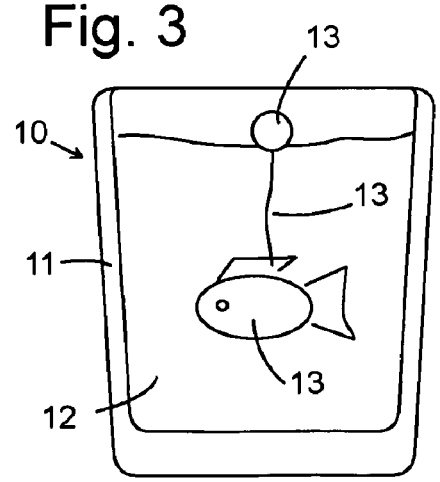
FIGS. 3 and 4 show variations of the unit for temperature monitoring.
Figure 4:
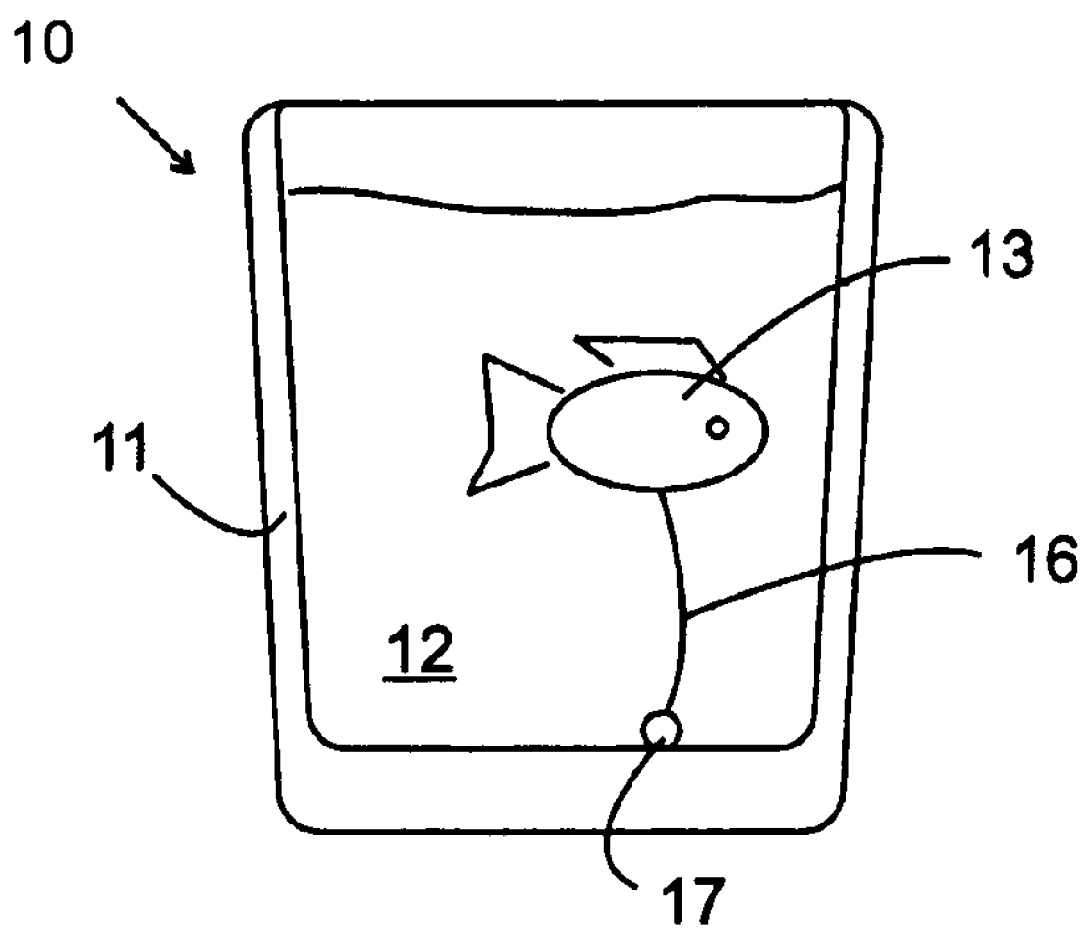

FIGS. 3 and 4 in each case show a modification of the unit 10 from FIG. 2. In the modification in FIG. 3 the swim element 13 is specifically heavier than water and is suspended on a hollow body 15 swimming on the water surface by a short thread 16, whereof the length is such that the swim element 13 swims at approximately halfway up in the water 12 whenever the container 11 is substantially filled with water, as shown in the figure.

In the modification of FIG. 4 the swim element 13 is vice versa specifically lighter than water, and it is connected via a thread 16 to a ballast body 17, which is denser than water and lies on the bottom of the container 11 and thus holds the swim element 13 at the halfway mark in the water 12.

The advantage of these two modifications is that the swim element 13 is held swimming freely in the water 12 and is not lying on the bottom of the container 11 or drifting on the water surface, if the density of the swim element deviates from that of the water. The demands on precision in manufacturing the swim element 13 are accordingly less than in the case of the unit from FIG. 2, and producing the swim element is accordingly simpler.

The container 11 is not specifically adapted to its use in the inventive unit. A drinking glass, an empty preserving jar or a similar see-through container can be used as container 11 for example, which is normally available in a household and is possibly used chiefly for other purposes. To enable a user to carry out the inventive process it suffices if only the swim element 13 (along with the hollow body 15 or the ballast body 17, if required) is made available by the manufacturer of the refrigerator as an accessory to a refrigerator, on which the process is to be carried out. If the user is not currently using the unit it suffices if he lifts the swim element 13 out for later usage, because the swim element can easily be used in another container 11 during later use, which is available at the relevant time.

Instead of a swim element, which reacts to only a single critical temperature, as described above, a swim element reacting to multiple temperatures could also be provided. With such a swim element in each case dyes with various colour-changing temperatures could be applied in an exemplary embodiment at various areas 19 of its surface, or a dye or dye mixture could be applied at the same, which can absorb three (or more) colours, depending on whether the temperature lies below a low critical temperature, above a high critical temperature or in between.

The invention claimed is:

1. A process for monitoring the temperature in a refrigerator, comprising:
   forming a unit from a temperature sensitive element and a thermal buffer liquid in a substantially transparent container with said temperature sensitive element being in substantially non-insulated contact with said thermal buffer liquid;
   placing the unit container at a site to be monitored inside the refrigerator; and
   visually observing said temperature sensitive element as it is in said substantially transparent container to determine if a temperature variable property of said temperature sensitive element indicates that the temperature in the refrigerator is at, below or above a predetermined temperature range.

2. The process according to claim 1, including selecting a quantity of said thermal buffer liquid such that temperature equalization of said unit and said refrigerator site requires at least about one hour.

3. The process according to claim 1, including forming said thermal buffer liquid from water.

4. The process according to claim 1, including forming said temperature dependent variable property of said temperature sensitive element without using any external energy supply.

5. The process according to claim 1, wherein the temperature variable property of said temperature sensitive element comprises a color of the temperature sensitive element, and wherein the visually observing step comprises visually observing the color of the temperature sensitive element.

6. The process according to claim 5, wherein the temperature sensitive element changes from a first color to a second color when a temperature of the buffer liquid changes from below a first threshold temperature to above the first threshold temperature, the first threshold temperature being above 0° C.

7. The process according to claim 6, wherein the temperature sensitive element changes from the second color to a third color when the temperature of the buffer liquid changes from below a second threshold temperature to above the second threshold temperature, the second threshold temperature being above the first threshold temperature.

8. The process according to claim 5, wherein the temperature sensitive element comprises a plurality of temperature sensitive elements, wherein each of the plurality of temperature sensitive elements changes color when a temperature of the buffer liquid changes from below a threshold value to above the threshold value, and wherein each temperature sensitive element changes color at a different threshold value.

9. A unit for monitoring the temperature in a refrigerator, comprising:
a container having a substantially transparent portion, said container being placeable at a site to be monitored inside the refrigerator at which site cooled air at least partially surrounds said container;
a thermal buffer liquid in said container; and
a temperature sensitive element in thermal contact with said buffer liquid, wherein the temperature sensitive element changes from a first color to a second color when a temperature of the buffer liquid changes from below a first threshold temperature to above the first threshold temperature, wherein the first threshold temperature is above 0° C., said container, when located at the site to be monitored inside the refrigerator, retaining therein said buffer liquid in a manner such that said buffer liquid is not thermally isolated from the cooled air at least partially surrounding said container and is subject to variations in its temperature in correspondence with respective increases and decreases in the cooled air at least partially surrounding said container, and said temperature sensitive element being supported within said container relative to said substantially transparent portion of said container such that a user can visually observe the color of said temperature sensitive element via said substantially transparent portion of said container to determine if a temperature in the refrigerator at a location external to the unit is below or above the first threshold temperature.

10. The unit according to claim 9, including said container having a capacity for said buffer liquid in the range of about fifty (50) to two hundred and fifty (250) cubic centimeters.

11. The unit according to claim 9, including said temperature sensitive element is located inside said container, wherein the temperature sensitive element can swim freely in said buffer liquid.

12. The unit according to claim 11, including said temperature sensitive element is lighter than said buffer liquid and includes at least one of a ballast or tether to a bottom of said container to maintain said temperature sensitive element immersed in said buffer liquid.

13. The unit according to claim 11, including said temperature sensitive element is heavier than said buffer liquid and includes at least one float in said container connected to said temperature sensitive element to maintain said temperature sensitive element immersed in said buffer liquid.

14. The unit according to claim 9 wherein the color of the temperature sensitive element changes from the first color to the second color when the temperature of the buffer liquid changes through a temperature range of about seven (7) and ten (10) degrees Celsius around the first threshold temperature.

15. The unit according to claim 9, wherein said temperature sensitive element has a plurality of separate portions with different properties.

16. The unit according to claim 15, including said separate portions with different properties are separate colors with different temperature limits for said property changes.

17. The unit according to claim 9, wherein the temperature sensitive element changes from the second color to a third color when the temperature of the buffer liquid changes from below a second threshold temperature to above the second threshold temperature, the second threshold temperature being above the first threshold temperature.

18. The unit according to claim 9, wherein the temperature sensitive element comprises a plurality of temperature sensitive elements, wherein each of the plurality of temperature sensitive elements changes color when a temperature of the buffer liquid changes from below a threshold value to above the threshold value, and wherein each temperature sensitive element changes color at a different threshold value.

19. A temperature sensitive element for a unit for monitoring the temperature in a refrigerator, the unit including a container with a thermal buffer liquid in said container, said temperature sensitive element comprising: a body for thermal contact with the buffer liquid wherein said body is immersed to swim freely in said buffer liquid, and wherein said body exhibits different substantially discrete colors which can be, in an observation event, visually observed to determine if the body is above or below a temperature limit to be monitored, said temperature limit being above 0° C., and said body remaining immersed in said buffer liquid during each observation event.

20. The temperature sensitive element according to claim 19, including said body has a plurality of separate portions, each of which changes color when the temperature of the body changes from below to above a threshold temperature, and wherein each of the plurality of separate portions changes color at a different threshold temperature.

21. The temperature sensitive element according to claim 19, including said body is in the form of a fish.

22. The temperature sensitive element according to claim 19, including said body is one of lighter than said buffer liquid and includes at least one of a ballast or tether to a bottom of said container to maintain said body immersed in said buffer liquid and heavier than said buffer liquid and includes at least one float in said container connected to said body to maintain said body immersed in said buffer liquid.

\* \* \* \* \*